United States Patent [19]

Wroblewski

[11] Patent Number: 4,959,831
[45] Date of Patent: Sep. 25, 1990

[54] SINGLE WIRE BUS SMART KEYPAD CONTROLLER SYSTEM

[75] Inventor: Thomas R. Wroblewski, Sterling Heights, Mich.

[73] Assignee: Chrysler Corporation, Highland Park, Mich.

[21] Appl. No.: 386,840

[22] Filed: Jul. 31, 1989

[51] Int. Cl.⁵ .............................................. H04J 3/02
[52] U.S. Cl. ................................. 370/112; 340/7 N; 341/26
[58] Field of Search ............... 370/85.1, 68, 711, 112; 340/815.27, 825.69, 752, 825.74; 341/26

[56] References Cited

U.S. PATENT DOCUMENTS

| | | | |
|---|---|---|---|
| 4,318,087 | 3/1982 | Wilson | 341/26 |
| 4,502,038 | 2/1985 | Lowenthal et al. | 341/26 |
| 4,677,308 | 6/1987 | Wroblewski et al. | 370/85.1 |

FOREIGN PATENT DOCUMENTS

| | | | |
|---|---|---|---|
| 0188151 | 12/1985 | European Pat. Off. | 341/26 |
| 60-175135 | 9/1985 | Japan | 341/26 |

Primary Examiner—Douglas W. Olms
Assistant Examiner—Dang Ton
Attorney, Agent, or Firm—Wendell K. Fredericks

[57] ABSTRACT

A smart multiplex keypad scanner system for scanning a matrix of switches utilizes a portion of a clock pulse to read the switch status of one of the switches in a matrix of switches in a system in which a standard counter of a chosen modulo value that counts up to a value one less than the number of switches in the matrix is employed to generate addresses of switches in the matrix.

10 Claims, 3 Drawing Sheets

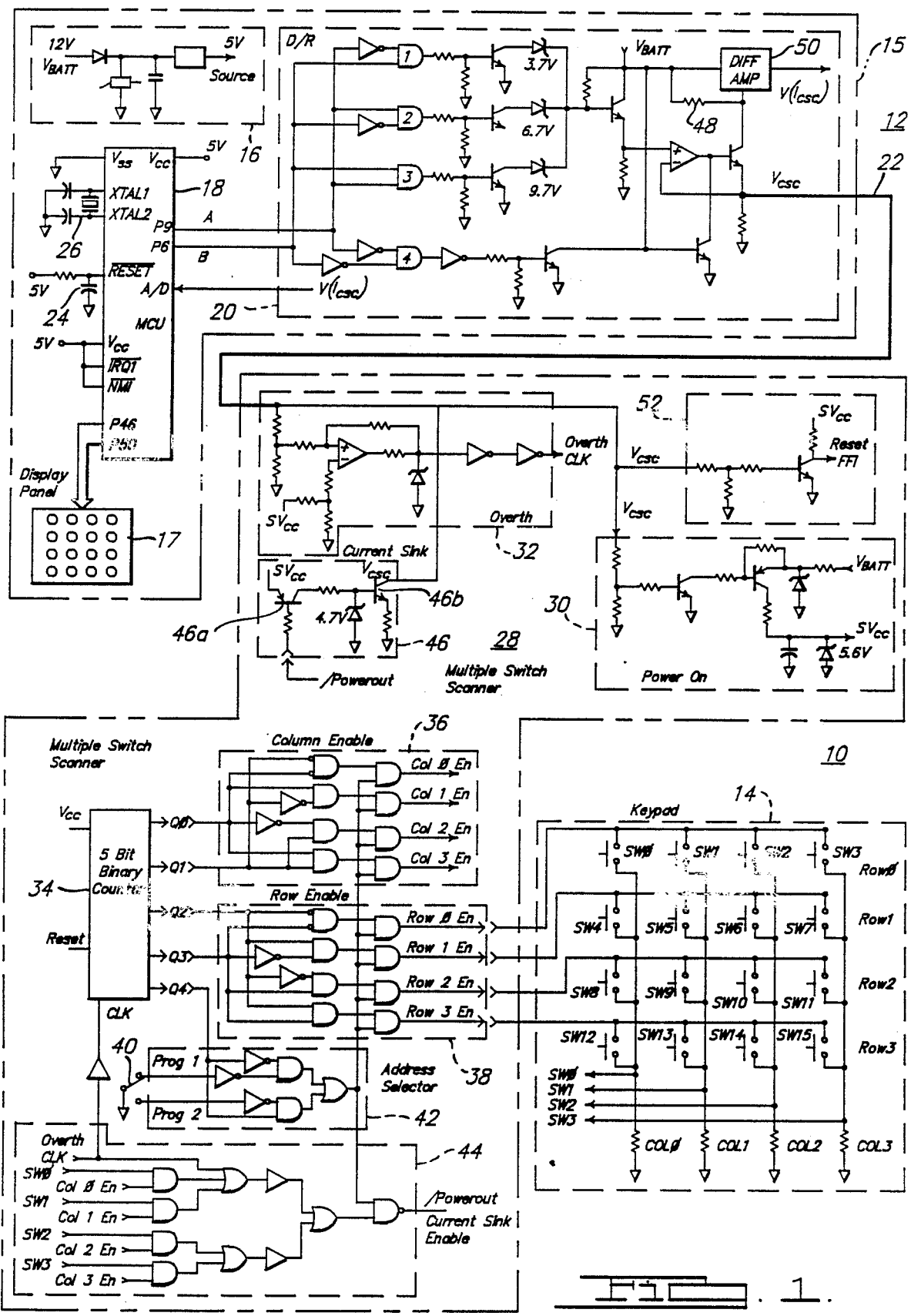

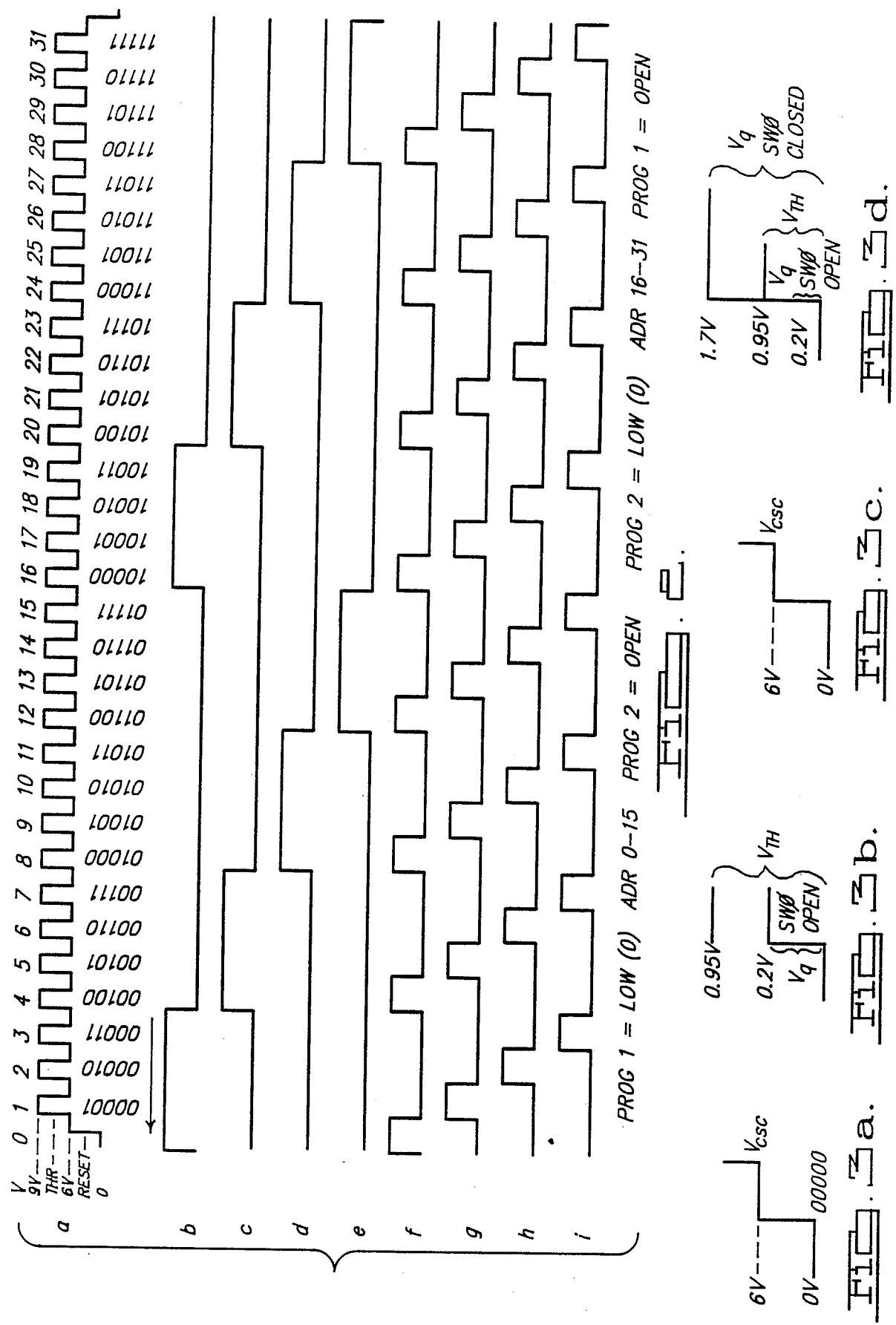

4,959,831

SINGLE WIRE BUS SMART KEYPAD CONTROLLER SYSTEM

BACKGROUND OF THE INVENTION

1. Field of the Invention

This invention relates to multiplexing techniques for obtaining status of a plurality of switches disposed at a remote location in the form of a matrix keyboard that connects to a controller by a single wire bus and, more particularly, in a preferred embodiment to systems for generating visual displays at a remote instrument panel indicative of the status of each switch of the matrix, the switches being separately scanned by a switch scanner that connects at a single point to the bus and controlled by a microcomputer within the remote instrument panel.

2. Description of the Prior Art

Scanning matrices of switches or keys of a keypad has generally been performed by microcomputers or controllers using complex software. Where separate keyboards are employed, a serial link between the controller and the keyboard usually improves reliability and saves on cable usage but further complicates the protocol between devices. Also, with matrices of switches, a problem sometimes exists in effectively addressing the switches.

In an effort to place a matrix of switches at a remote location and use a minimum number of wires between the controller and the matrix, a search was initiated for a scheme that would use as few as a single wire between devices as well as to manage control of the scan pulses used to scan the switches. That search resulted in the improved matrix scanner system of the present invention.

BRIEF SUMMARY OF THE INVENTION

The present invention is concerned with a serial link smart keypad controller system for supplying power to a keyboard scanner and the keypad and for sequentially scanning each key switch of a keyboard matrix in order to read each key switch and then use the switch information to display diagnostic and current operating conditions. A driver/receiver (D/R) unit controlled by a microcomputer (MCU) contains an off-set squarewave generator circuit which develops an off-set squarewave pulse train. Superimposed over the initial "state" of the voltage pulse train are pulse signal codes used for addressing switches within the keyboard matrix.

The D/R unit drives the pulse train over the serial bus to the scanner module. The off-set squarewave train places several "states" of voltage level signals on the serial bus; the scanner module responds to an initial "state" of the voltage signal which provides power to turn on the scanner.

A toggle-type up-counter contained in the scanner module provides bit data to combinational logic in the scanner module for enabling the columns and rows of the keyboard matrix so as to address the switches. The counter is a conventional asynchronous counter used to provide a clock count to represent a switch address. But, however, since the module count of this counter is one less than the number of switches employed in the matrix, a novel scan scheme is employed permitting scanning the switch without an address. Both leading and trailing transitions of the pulse signals enable circuits in the scanner module to transmit over the serial link current signals which the D/R unit thereafter receives, interprets and then converts into voltage signals used by the MCU to ascertain whether or not any addressed switch is present during the leading transition of the pulse and then whether the switch is opened or closed during the negative transition. An input/output port of MCU transfers this switch status information to an instrument console of the vehicle where the selected switch data is displayed visually on a display panel. These switches in the matrix may be associated with, illustratively, adjustments to the radio such as adjustments to the volume, the changing of stations, displaying the speed, the temperature, etc.

BRIEF DESCRIPTION OF THE DRAWING

FIG. 1 is a partial block, partial schematic diagram of a serial link, keypad controller system which sets the operating environment for the matrix keypad according to the invention;

FIG. 2 is a waveform/address sequence diagram depicting the polling of the keypad switches and the various voltage states of the off-set squarewave used by the scanner module;

FIGS. 2b–2i depict the timing of the row and column enable signals generated by the combinational logic used by the scanner modules to scan the keys of the keypad;

FIGS. 3a to 3d depict the portion of the wave form in FIG. 2 used to depict the presence and the status of switch 0 if switch 0 is initially pressed.

DETAILED DESCRIPTION OF A PREFERRED EMBODIMENT

Figure 4:
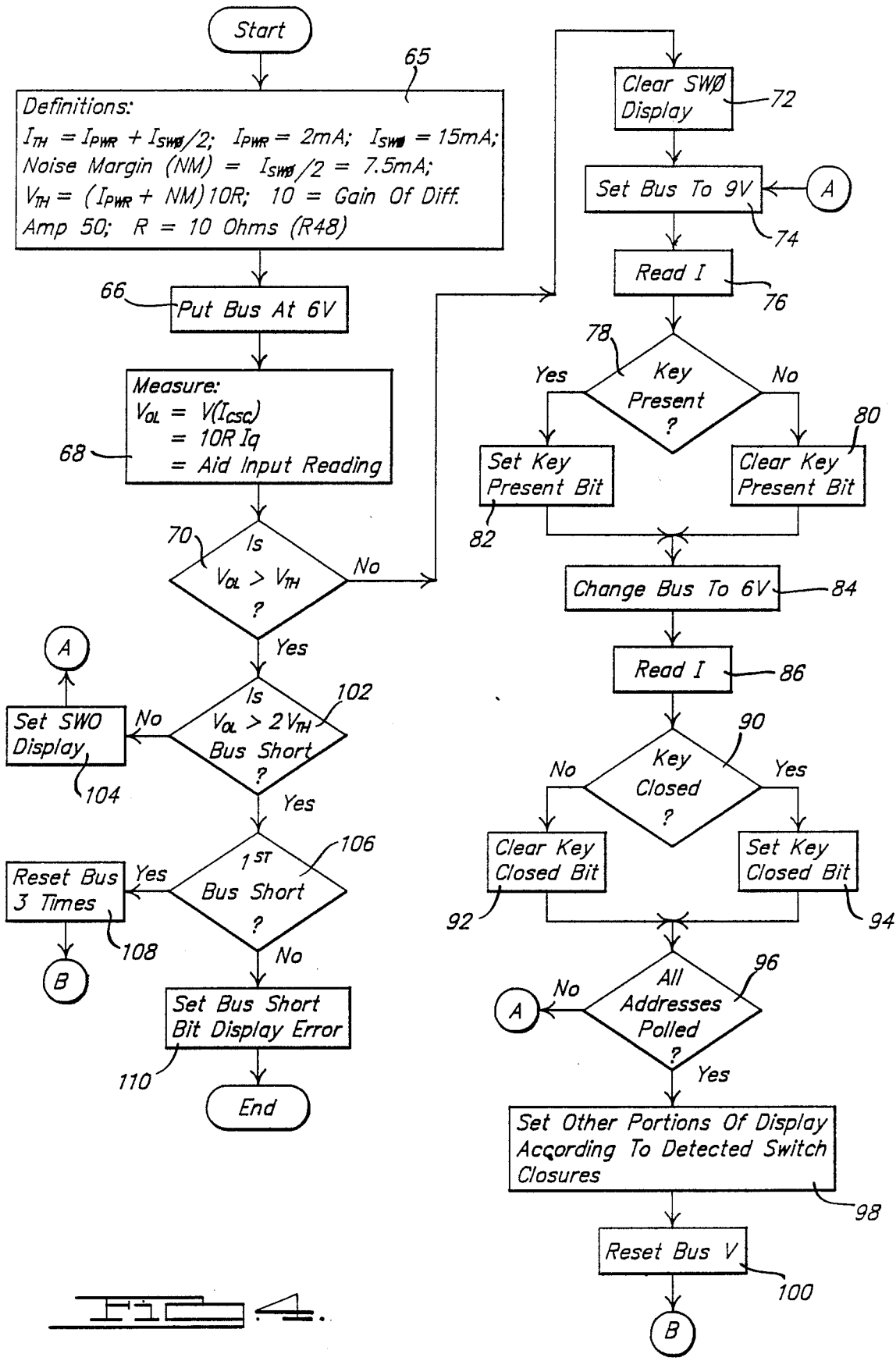
FIG. 4 is a flow chart indicating the program routine used by the MCU of this invention to recognize the presence and status of switch 0 during the initial phases of the off-set waveform of FIG. 2.

Referring now to FIGS. 1 through 3, FIG. 1 is a partial block diagram, partial schematic diagram of a preferred embodiment of a serial link smart keypad scanner system 10.

With +12 volts DC battery supply voltage applied to an instrument compartment 12 incorporating system 10, a display of status information about each switch SW0–SW15 of matrix keypad 14 appears on a display device 17.

CONTROL UNIT

A control unit 15 comprised of a regulated 5-volt regulator circuit 16, a microcontroller computer (MCU) 18 and a driver/receiver (D/R) unit 20 connects between a battery or a +12 volt DC supply and a single wire bus 22 for generating power as well as for providing signals for scanning the key pad 14.

To establish a precise 5-volt source for microcontroller operations, regulator circuit 16 connects between the battery and MCU 18. The battery output voltage, illustratively, 12 VDC±25% enters an input circuit of regulator 16 wherein suitable voltage regulation occurs to maintain a precise output voltage (e.g., 5 volts DC+or−2.5%). Regulator 16 also provides, after an externally programmed delay a 5-volt DC signal for resetting MCU 18 during a POWER-ON phase. The 5-volt DC signal which is supplied to a not reset (/reset) terminal of MCU 18 provides a delayed signal allowing D/R 20 to become ready for MCU control.

Note that presentation of logic signals and equations will employ a "+" symbol to denote an OR function; a "*" symbol to denote an AND function, and a "/" symbol prefix of a logic name to mean the complement of the logic name. Capacitor 24 provides the external program delay function, holding the output voltage from regulator 16 LOW for a fraction of time (e.g., 20 milliseconds) delaying the start-up of MCU 20. After the delay, the /reset goes HIGH and MCU 18 starts executing a factory installed program (the firmware) stored in ROM of MCU 18.

MCU 18, illustratively, a single chip 8-bit unit such as a Motorola MC 68705S3 microcontroller chip contains a CPU, ON-chip clock, ROM, RAM, input/output interface I/0, analog to digital converter (ADC) and a timer. The ON-chip clock is controlled by an external oscillator 26.

DRIVER/RECEIVER CIRCUIT

MCU 18 generates logic signals from ports A and B which go to D/R 20 to develop a bus off-set, squarewave voltage signal $V_{csc}$ similar to that shown in FIG. 2a. $V_{csc}$ provides power and control signals for operating a multiple switch scanner 28 and provide address signals for addressing keys of keypad 14. This off-set squarewave voltage signal comprises five states, mainly an OFF state or 0 volt; a reset state, illustratively, 3 volts; a 6 volt state; a thresholdvoltage $V_{thr}$ state of approximately 7.5 volts and a 9-volts state. The reset state occurs during transitions from the 0volt to the 6-volts state or vice-versa; the threshold state results during the transitions from the 6-volts to the 9-volts state as well as the transitions from the 9-volts to the 6-volts state.

As shown in FIG. 1, D/R 20 connected between MCU 18 and bus 22 contains suitable digital logic circuits an linear devices for generating the wave form of FIG. 2A. Digital inputs from MCU 18 placed at terminals A and B of D/R 20 produces the $V_{csc}$ on bus 22. $V_{csc}=0$ volt when MCU 18 sends /A * /B levels to the input of D/R 20; $V_{csc}=3$ when /A * B appear; $V_{csc}=6$ when A * /B appear and $V_{csc}=9$ volts when A * B appear. MCU 18 writes the digital inputs to D/R 20 at a chosen rate.

SINGLE WIRE BUS

As mentioned supra, bus 22, a bi-directional signal wire communication assembly, allows transmissions of voltage and current from D/R 20 to the multiple switch scanner 28. Illustratively, this single wire may consist of a flexible length of wire of a suitable gauge covered with an insulative material at all points except for scanner interface regions. Bus 22 should possess some degree of flexibility in order to route in the vicinity of all the remote switches that require the scanning operation.

MULTIPLE SWITCH SCANNER

Multiple switch scanner 28 located remote from D/R 20 but connected to bus 22 at a single point utilizes the $V_{csc}$ signal to develop a POWER-ON scanner voltage, $SV_{cc}$ from a POWER-ON circuit 30. Within scanner 28, the POWER-ON circuit 30, illustratively, a transistor circuit operated in a saturated mode connects between the battery to get battery power $V_{batt}$ and bus 22 to obtain $V_{csc}$ power. The POWER-ON circuit 30 provides $SV_{cc}$ voltage as long as $V_{csc}$ from bus 22 remains above 3 volts. $SV_{cc}$ is available during the transmission of each address pulse of the pulse train of $V_{csc}$.

Also within scanner 28, an over-threshold circuit 32 connected between bus 22 and the output of the POWER-ON circuit 30 contains, illustratively, an operational amplifier for providing an over-threshold clock signal (OVERTH CLK) when $V_{csc}$ goes above, illustratively, 7.5 volts. The clock signal from over-threshold circuit 32 clocks a 5-bit binary counter 34 to produce scanning logic signals Q0–Q4 used to develop 32 switch addresses.

The scanning logic signals from counter 34 enter column enable combination logic circuit 36 and row enable combination logic circuit 38 as shown in FIG. 1 and, as depicted in FIG. 2b–2i, enables row 0 initially of the matrix a depicted in FIG. 26 and then enables in succession columns 0 through 3 as depicted in FIGS. f–i. Then row 1 is enabled as depicted in FIG. 2c and column 0 through 3 are again enabled. This process continues until all the columns and rows of the matrix are separately enabled. FIGS. 2d and 2e represent rows 2 and 3.

MATRIX ARRANGED SWITCHES

The row enable signals route to the 16 switch matrix key pad circuit 14. Only 16 switches appear on FIG. 1, but this embodiment can scan up to 32 switches. Address selector circuit 42, connected between the binary counter 34 and the column and row enable circuits 36 and 38, respectively, and a /POWER-OUT circuit 44 comprised of combinational logic circuits provide scanning of the first 16 switches, switches 0–15, when a manual switch 40 is positioned to program 1 and scanning of the next 16 switches when switch 40 is positioned to program 2. Keypad 14 contains conventional normally open switches and suitable pull-down resistors disposed at the terminations of the columns of the matrix. Output signals SW0 through SW3 from column 0 through column 3, respectively, provide input signals to the combinational logic of a /POWEROUT circuit 44. The column enable circuit 36 and row enable circuit 38 provide input signals to the combinational logic POWER-OUT circuit 44 which produces a /POWER-OUT signal used as a current sink enable signal. The /POWER-OUT signal generates to indicate the presence of the scanner each time an address pulse of $V_{csc}$ rises above the threshold as in equation 1.

1.  (1)

/POWER-OUT = (/PROG1 */Q4 [output from stage 4 of counter 34] + /PROG2 * Q4) * OVERTH CLK

POLLING ROUTINE

The /POWER-OUT signal also routes to a current sink circuit 46 when the trailing edge of each off-set squarewave pulse used to clock the 5-bit binary counter 34 goes below the threshold voltage as in equation 2.

/POWER-OUT = (/PROG1 */Q4 +  (2)

/PROG2 * Q4) * (OVRTH CLK + SW0 * COL0en +

SW1 * COL1en + SW2 * COL2en + SW3 * COL3en)

If an addressed keypad switch is closed, the current sink circuit 46 will cause the bus current to sink to ground through relatively low resistance allowing approximately 15 mA more to flow through the resistor 48 in the driver/receiver unit 20. If an addressed keypad switch is opened, the bus will maintain the state of $V_{csc}$ with no additional current being drawn.

When the bus current sinks towards ground, the additional bus current flows through resistor 48 in the driver/receiver module D/R 20. Differential amplifier 50 provides an output voltage signal V ($I_{csc}$) to the A/D input of an analog to digital converter (ADC) (not shown) in MCU 18.

MCU 18 compares the address sent out over ports 6 and 9 with the response from the ADC to determine the status of the addressed keypad switch. The status information of the keyboard switch is displayed on the display panel 17 and, fi necessary, routed to other peripheral devices that might use such information.

DETECTING SWITCH 0

Because the 5-bit counter 34 is a modulo 32 counter which has 31 count states, to provide an address for switch 0, which is assigned address 00000, detection of a closed or open switch 0 must occur with the initial transition of the pulse train Vcsc from 0-volt to 6 volts during the initial 6V pulse. FIG. 3 depicts an enlargement of that portion of the pulse train.

If switch 0 is open after this transition of the pulse train, bus 22 will carry a quiescent power current, Ipwr of about 2 mA. This current represents the current drawn by the scanner circuits when none of the switches of the matrix are pressed. A voltage representing this current is measured and stored in memory within MCU 18 system 10 and is later used during the detection of switch 0.

If switch 0 is not pressed, the /POWEROUT signal is not generated during the initial 6 volts state. The first 9 volt pulse is used to address switch 1. If switch 0 is pressed, then the /POWEROUT signal occurs as a result of the logic equation 3.

$$/POWEROUT = /PROG\ 1 * SW0 * COL0en \quad (3)$$

Rather than the OVERTHRESHOLD voltage portion of the pulse train generating /POWEROUT, the SW0 and COL0en signals from the combinational logic circuits provide logic responses that are not derived from toggling counter 34. These responses occur because the column enable and row enable combinational logic circuits are activated by the POWER ON circuit 30 which receives power when the bus voltage exceeds 5.6 volts.

This /POWEROUT signal provides base bias current which turns on PNP transistor 46a which when conducting turns on transistor 46b of the current sink circuit 46. When transistor 46b conducts, the current on bus 22 increases to a value representative of the quiescent power Ipwr as mentioned supra of about 2 ma plus the value of the current in the circuit of switch 0 which is about 15 ma.

When more current goes through bus 22, the current through resistor 48 of FIG. 1 increases the signal from the difference amplifier 50 in D/R 20. Difference amplifier 50 sends a voltage signal V(Icsc) back to the A/D of MCU 18 to provide a status signal to the microcontroller of the condition of switch 0.

OPERATION OF THE SYSTEM

The operation of the system will now be discussed with reference to FIGS. 1–3 and the flow chart of FIG. 4 which depicts the program executed by MCU 18. After START UP of the program and after the 20 ms power on delay, MCU 20 executes a small start-up program which sets all CPU registers with correct values and clears all information presently in memory before accepting information from D/R 20. MCU 18 also initializes the counters in RAM and the stored variables. The desired addresses to be sent over the bus to D/R 20 are stored in memory and all initial conditions are met.

In this embodiment, the stored information includes the sequence for addressing the keys of the matrix. As can be appreciated by those skilled in the art, MCU 18 operates in the MHz range while the rest of system 10 operates around the one kHz range. Hence, MCU 18 can perform many tasks before the remainder of system 10 reacts.

After defining terms in block 65, as indicated in processing-function block 66, the program tells MCU 18 to put Vcsc of bus 22 to 6 volts. In performing this instruction, MCU 18 writes to ports A and B in a manner providing to the inputs of the AND gates 1–4 in D/R 20 suitable logic signals to set the initial portion of the off-set squarewave at 6 volts as shown in FIG. 3a.

The bus 22 is brought up to the initial 6 volts in order to obtain a quiescent power current (Ipwr) for the scanner 28. Then in the processing-function block 68, MCU 18 is told to measure Vq. MCU 18 measures Vq by reading the quiescent current (Iq) of the bus obtained through resistor 48 in D/R 20 and sent back to the A/D port of MCU 18. Vq is the voltage at the A/D input of MCU 18.

To establish a threshold voltage (Vth) for the bus, MCU 18 performs the calculations shown in equation (4).

$$\begin{aligned} Vth &= (Ipwr + \text{Noise Margin}) * \text{Diff Amp Gain} * R \quad (4)\\ &= (2\ mA = 15\ mA/2) * 10 * 10\ \text{ohms} \\ &= (2\ mA + 7.5\ mA) * 100\ \text{ohms} \\ &= 9.5\ mA * 100\ \text{ohms} \\ &= 0.95\ V \end{aligned}$$

The quiescent voltage Vq is derived in equation (6)

$$Vq = 10 * R * Iq \quad (6)$$

where $Iq = Ipwr$ if sw0 is open and $Iq = Ipwr + Isw0$ if sw0 is closed $$\begin{aligned} Vq &= 10 * 10\ \text{ohm} * 2\ mA \quad (6a)\\ &= 0.2\ V \text{ if } sw0 \text{ is open (see FIG. 3b)} \end{aligned}$$

$$\begin{aligned} Vq &= 10 * 10\ \text{ohms} * (2\ mA + 15\ mA) \quad (6b)\\ &= 100\ \text{ohms} * 17\ mA \\ &= 1.7\ V \text{ is } sw0 \text{ is closed (see FIG. 3d)} \end{aligned}$$

Using the results of equations (6a) and (6b) as in decision block 70 MCU 18 determines if Vq is greater than Vth. Vq exceeds Vth if sw0 is closed since, from equation 6b, Vq=1.7 V which is greater than Vth which equals 0.95 V. Vq is lower than Vth if sw0 is open since, from equation 6a, Vq=0.2 V which is lower than Vth which equals 0.95 V. These measurements are performed during the initial portion of $V_{csc}$.

If MCU 18 determines that the Vq is greater than 2×Vth, as in decision block 102, then MCU 18 must check to see whether or not the bus has shorted. If Vq is less than 2×Vth, then MCU 18 takes the NO branch and set switch 0 display to indicate that switch 0 is closed as indicated in process function block 104. Then MCU 18 proceeds to process function block 74 to set the bus to 9 volts.

If, as indicated in decision block 102, Vq is greater than 2×Vth then MCU 18 determines whether or not this is the first bus short. If it is the first time that the bus has been shorted, then MCU 18 takes the YES branch and proceeds to process function block 108 and resets the bus three times. Then MCU 18 is instructed to put the bus at 6 volts as indicated in function block 66 and the measurements of Vq is repeated again. If it is determined that the bus is not shorted, then MCU 18 takes the NO branch and proceeds to set the bus to 9 volts as in process function block 74 and then it is instructed to read the current on the bus as indicated in process function block 76. MCU 18 now examines the remaining 31 keys to determine whether or not any of those keys have been pressed. Hence, in decision block 78, MCU 18 is instructed to determine if any keys are present. If a key is present, then MCU 18 is instructed as in process function block 82 to set the key present bit. If MCU 18 detects that there is no key present at the particular address being examined, then MCU 18 is instructed to clear the key present bit as indicated in process function block 80. In either case, MCU 18 is instructed to change the bus to 6 volts and then read as indicated in process function block 84 and then to read the current on the bus as indicated on process function block 86.

Assuming that the keys are present, MCU 18 must make a decision as to whether or not a key is closed a indicated in decision 90. If a key is closed, then MCU 18 is instructed as in process function block 94 to set the key close bit. If the key is determined to be open, then MCU 18 is instructed to clear the key closed bit as indicated in process function block 92.

Then MCU 18 makes a decision as to whether or not all addresses have been polled as is indicated in decision block 96. If all addresses have been polled, then MCU 18 is instructed as in process function block 98 to set other portions of the display according to the detected switch closures and then MCU 18 is then instructed to reset the bus voltage as indicated in process function block 100 and proceed back to function block 66. If all addresses have not been polled, then MCU 18 goes back to process function block 74 and proceeds to set for the remaining keys to determine whether or not they are present and then whether or not they are closed.

It is to be understood that the above-described embodiment is mainly illustrative of the principles of the present invention. Although a discrete embodiment is disclosed, an integrated embodiment equivalent could be developed. One skilled in the art may make changes and modifications to the embodiments disclosed herein and may devise other embodiments without the departing from the scope and essential characteristics thereof.

I claim:

1. A single wire bus multiplex system for a smart multiple switch scanner for use with a pulse-train signal comprising a succession of coded-pulse signals superimposed over an offset-voltage signal, said coded-pulse signals providing a series of address codes for addressing a plurality of switches arranged as a matrix of switches at a remote location, said matrix comprising a plurality of row and column lines with each switch having a post connected to a row line and another post connected to a column, said system comprising:
   (a) means for generating the pulse-train signal;
   (b) a bi-directional, single-wire bus adapted to transfer the pulse-train signal from a first end of said bus in a first direction to the remote location of the matrix and a series of current signals from a second end in a second direction, said bus being routed near the matrix;
   (c) switch scanning means connected between said bus and the matrix, responsive to said pulse-train signal comprising:
      (1) means for developing an internal power source from said offset-voltage signal;
      (2) means for decoding said coded-pulse signals to obtain a series of address codes for addressing all but one switch of the matrix, said decoding means including an asynchronous counting means, said counting means having a capacity to count up to an exact count of one less than twice the total number of switches in the matrix;
      (3) means for using said series of address codes to sequentially scan the column and row lines of the matrix so as to sequentially address each switch; and
      (4) means for generating a first current signal on said bus in the second direction indicative that each switch with an address has been addressed and a second current signal indicative of each switch being pressed;
      (5) for the switch without an address, means for generating a first current signal on said bus in the second direction indicative that the switch without an address is present and a second current signal of the switch without an address has been pressed;
   (d) analog means at the first end of said bus for receiving the current signals on said bus and producing therefrom a series of analog voltage signal messages;
   (e) means for converting said analog voltage signal messages into a first series of digital-coded messages;
   (f) means responsive to the digital-coded messages for analyzing the messages and providing a second series of digital-coded messages that provide an interpretation of the analyses; and
   (g) display means responsive to said second series of digital-coded messages for transforming said second series of digital-coded messages into a visible intelligible message.

2. Apparatus in accordance with claim 1 wherein said pulse-train signal generating means includes:
   (a) a regulated voltage source means coupled to a fixed voltage source for producing a regulated voltage of a chosen voltage level;
   (b) a microcontroller means powered from said regulated voltage source means including means for generating a series of logic signals for forming the pulse-train signal; and
   (c) a driver/receiver means comprising suitable combinational logic, switching and analog circuits for accepting said series of logic signals and producing therefrom the pulse-train signal.

3. Apparatus in accordance with claim 2 wherein the pulse-train signal has at least six "states", namely: a first "state" that rises from a reference voltage to a first voltage level, a second "state" that rises from said first voltage level to a threshold voltage level, a third "state" that rises from said threshold voltage level to a maximum voltage level above said threshold voltage level, a fourth "state" that descends from said maximum voltage level to said threshold voltage level, a fifth "state" that descends from said threshold voltage level to said first voltage level and a sixth "state" that descends from said fifth "state" to said reference voltage.

4. Apparatus in accordance to claim 3 wherein within said scanner means:
   (a) power source developing means is a power-on means responsive to each "state" of the pulse-train signal above said second "state" and connects to the fixed voltage source for generating a regulated fixed voltage signal for providing power internal to said switch scanner means;
   (b) said decoding means is an overthreshold detection means responsive to the pulse-train signal when each pulse of the pulse-train signal goes above said threshold voltage for generating a series of overthreshold clock signals;
   (c) said counting means is a binary counter means responsive to said overthreshold clock signals for generating a series of clock-output signals that provide a running total count of one less the number of the pulses in the pulse-train signal;
   (d) said sequentially scan means includes first combinational logic means responsive to said series of clock output signals for generating a series of logic signals to an input of the matrix of switches for sequentially enabling chosen line of the matrix in order to scan the matrix to address all the switches but one and to detect the occurrence of a coupling of a row line to a column line by any switch in response to that switch being pressed causing a current signal to appear at an output of the matrix; and
   (e) said means for generating said first and second current signals on said bus in the second direction includes another combinational logic means coupled to said counter means and to said first combinational means for generating a current sink enabling signal used to transmit the current signal over the bus in the second direction indicative of a pressed switch and current sink means responsive to said current sink enabling signal for causing a first increased current signal on the bus in a manner that indicates a presence of a switch after said fourth "state" of the pulse and for causing a second increased current signal on the bus in a manner indicative of a switch being pressed after said fifth "state".

5. Apparatus in accordance with claim 4 wherein a switching means coupled to said first and another combinational logic means permit enabling the lines of the matrix in a manner that allows the matrix of switches to be transformed into a second matrix of switches causing the count of switches to equal one less than the modulo count of said counter means.

6. Apparatus in accordance with claim 5 wherein said means for converting said analog-message signals into digital-coded messages is an analog-to-digital converter in said microcontroller means.

7. Apparatus in accordance with claim 6 wherein said means for analyzing, interpreting and providing said second digital-coded message include:
   (a) first measuring means for obtaining a measure of a voltage corresponding to the current on the bus during said second "state" of the pulse-train signal for determining whether the voltage is above a threshold voltage of said bus, the voltage not being above the threshold voltage is indicative of the switch without an address has not been pressed;
   (b) second measuring means for determining if said bus is "shorted" during said second "state" of the pulsetrain, said bus being shorted when the voltage corresponding to the current on said bus at this time is above twice the threshold voltage, said switch without an address is closed when the voltage corresponding to the current on the bus is less than two times the threshold voltage but greater than the threshold voltage;
   (c) third measuring means for determining the current in the second direction of said bus during said forth "state" of the pulse-train signal for determining if an addressed switch is present, said address switch being present when first increased current on said bus occurs;
   (d) fourth measuring means for determining the current in the second direction of said bus during said fifth "state" of the pulse train signal for determining whether the addressed switch that is present is closed, said addressed switch being closed when said second increased current on said bus occurs; and
   (e) digitized message means for providing a digitally-coded measure to said display means indicative of the state of said bus and the status of the matrix switches.

8. Apparatus in accordance with claim 7 wherein said first through fourth measuring means, said digitized means and said means for generating said series of logic signals for forming the pulse train are microcontroller instructions in firmware for said microcontroller means.

9. Apparatus in accordance with claim 8 wherein said switch scanner means also includes a reset circuit means responsive to said sixth "state" for providing a reset signal to said counting means upon completion of the decoding of a last address code within the pulse train signal.

10. Apparatus in accordance with claim 9 wherein the pulse-train signal includes a series of pulse trains, each pulse train containing the series of address codes for addressing all but one of the switches in the matrix each series of pulse trains starting with a first "state", said first "state" being used to detect the status of the switch without an address and terminating with said sixth "state".

* * * * *